United States Patent
Matsukawa et al.

(10) Patent No.: US 10,222,289 B2
(45) Date of Patent: Mar. 5, 2019

(54) LEAK TEST METHOD AND LEAK TEST APPARATUS

(71) Applicant: TOYOTA JIDOSHA KABUSHIKI KAISHA, Toyota-shi (JP)

(72) Inventors: Tetsuya Matsukawa, Okazaki (JP); Ryuuichi Nukii, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 159 days.

(21) Appl. No.: 15/161,856

(22) Filed: May 23, 2016

(65) Prior Publication Data

US 2016/0363503 A1    Dec. 15, 2016

(30) Foreign Application Priority Data

Jun. 11, 2015  (JP) .................................. 2015-118540

(51) Int. Cl.

| | | |
|---|---|---|
| *G01M 3/02* | (2006.01) | |
| *F02D 41/22* | (2006.01) | |
| *G01M 3/32* | (2006.01) | |
| *F02D 41/00* | (2006.01) | |
| *F02D 35/02* | (2006.01) | |

(52) U.S. Cl.
CPC ........... *G01M 3/025* (2013.01); *F02D 35/023* (2013.01); *F02D 41/009* (2013.01); *F02D 41/22* (2013.01); *G01M 3/3272* (2013.01); *Y02T 10/40* (2013.01)

(58) Field of Classification Search
CPC ..................................................... G01M 3/025
USPC ............................................................ 73/40
See application file for complete search history.

(56) References Cited

U.S. PATENT DOCUMENTS

| | | | | |
|---|---|---|---|---|
| 5,299,545 | A * | 4/1994 | Kuroda | ................. F02D 41/003 |
| | | | | 123/198 D |
| 5,471,400 | A * | 11/1995 | Smalley | .................. G01M 3/26 |
| | | | | 702/51 |
| 5,492,006 | A | 2/1996 | Beckett | |
| 5,814,724 | A * | 9/1998 | Romkee | ................ G01M 15/06 |
| | | | | 33/603 |

(Continued)

FOREIGN PATENT DOCUMENTS

| | | |
|---|---|---|
| JP | 61-096132 A | 8/1986 |
| JP | 04-055538 U | 5/1992 |

(Continued)

*Primary Examiner* — John Fitzgerald
*Assistant Examiner* — Rodney T Frank
(74) *Attorney, Agent, or Firm* — Oblon, McClelland, Maier & Neustadt, L.L.P.

(57) ABSTRACT

In a leak test method, a crank angle is set to a specific phase. When a crankshaft is positioned in the specific phase, an intake or exhaust valve of each cylinder including a combustion chamber having an inner volume that has become larger than an average value of inner volumes of combustion chambers of all the cylinders is open. When the crankshaft is at the set crank angle, a fluid for leak test is injected through intake and exhaust ports where the intake and the exhaust valves are disposed and that communicate with the combustion chambers, and through an engine opening other than the intake and the exhaust ports, with an opening of the engine other than the intake and exhaust ports and the engine opening to which the fluid is supplied in the leak test sealed. After fluid injection is completed, a pressure in the engine is measured.

7 Claims, 6 Drawing Sheets

(56) References Cited

U.S. PATENT DOCUMENTS

| | | | | |
|---|---|---|---|---|
| 6,807,851 B2* | 10/2004 | Wakahara | .......... | F02M 25/0809 73/114.38 |
| 2004/0226344 A1* | 11/2004 | Stritzelberger | ....... | F04B 43/009 73/40 |
| 2005/0005880 A1* | 1/2005 | Bale | ...................... | F02D 33/003 123/90.11 |
| 2006/0142930 A1* | 6/2006 | Okubo | .................. | G01L 23/225 701/114 |
| 2009/0276141 A1 | 11/2009 | Surnilla et al. | | |
| 2015/0204257 A1* | 7/2015 | Osumi | ................ | F02D 41/0062 123/564 |
| 2016/0032872 A1* | 2/2016 | Dudar | ................ | F02M 25/0809 73/40.5 R |
| 2016/0245221 A1* | 8/2016 | McEwan | ................ | F02D 41/38 |

FOREIGN PATENT DOCUMENTS

| | | |
|---|---|---|
| JP | 9-159566 | 6/1997 |
| JP | 10-153518 | 6/1998 |
| JP | 2005-061305 A | 3/2005 |
| JP | 2005-098772 A | 4/2005 |

* cited by examiner

LEAK TEST METHOD AND LEAK TEST APPARATUS

INCORPORATION BY REFERENCE

The disclosure of Japanese Patent Application No. 2015-118540 filed on Jun. 11, 2015 including the specification, drawings and abstract is incorporated herein by reference in its entirety.

BACKGROUND OF THE INVENTION

1. Field of the Invention

The invention relates to a leak test method of detecting a leak in an engine, and relates also to a leak test apparatus configured to detect a leak in an engine.

2. Description of Related Art

There is a known leak test method of detecting a leak in an engine including camshafts rotatably disposed, a crankshaft coupled to the camshafts and rotatably disposed, and a plurality of cylinders each of which is provided with an intake valve and an exhaust valve that are driven by the camshafts and each of which includes a combustion chamber defined by a piston driven by the crankshaft and a cylinder wall (refer to Japanese Patent Application Publication No. 10-153518 (JP 10-153518 A)). In order to supply the fluid that have been introduced to the intake and exhaust ports into the combustion chambers of all the cylinders, the intake and exhaust camshafts that are not coupled to the crankshaft are rotated to open the intake or exhaust valve of each of all the cylinders. In this way, the fluid is supplied to the combustion chambers of all the cylinders.

In the above-described leak test, in order to fill the combustion chambers of all the cylinders with the fluid (e.g. air), the camshafts are rotated to open and close the intake or exhaust valve of the combustion chamber of each of all the cylinders. Thus, it takes a long time before the leak test is started. In particular, it takes a lot of time to fill the combustion chambers having a large inner volume with the fluid. Thus, a higher priority needs to be given to a supply of the fluid to the combustion chambers having a large inner volume.

SUMMARY OF THE INVENTION

The invention provides a leak test method and a leak test apparatus that make it possible to reduce the time required for a leak test.

A first aspect of the invention relates to a leak test method of detecting a leak in an engine including camshafts rotatably disposed, a crankshaft coupled to the camshafts and rotatably disposed, and a plurality of cylinders. Each of the cylinders is provided with an intake valve and an exhaust valve that are driven by the camshafts, and each of the cylinders includes a combustion chamber defined by a cylinder wall, an engine head, and a piston driven by the crankshaft. The leak test method includes: setting a crank angle of the crankshaft to a specific phase of the crankshaft, the specific phase being a phase in which the intake valve or the exhaust valve of each of the cylinders each including the combustion chamber having an inner volume that has become larger than an average value of inner volumes of the combustion chambers of all of the plurality of the cylinders is in an open state when the crankshaft is positioned in the specific phase; injecting, when the crankshaft is at the set crank angle, a fluid for a leak test through intake ports and exhaust ports in which the intake valves and the exhaust valves are respectively disposed, the intake ports and the exhaust ports being communicated with the combustion chambers, and through an opening of the engine other than the intake ports and the exhaust ports, in a state where an opening of the engine other than the intake ports, the exhaust ports, and the opening of the engine to which the fluid is supplied at a time of the leak test is sealed; and measuring a pressure in the engine after injection of the fluid is completed.

A second aspect of the invention relates to a leak test apparatus configured to detect a leak in an engine including camshafts rotatably disposed, a crankshaft coupled to the camshafts and rotatably disposed, and a plurality of cylinders. Each of the cylinders is provided with an intake valve and an exhaust valve that are driven by the camshafts, and each of the cylinders includes a combustion chamber defined by a cylinder wall, an engine head, and a piston driven by the crankshaft. The leak test apparatus includes a setting portion, an injection portion, and a measurement portion. The setting portion is configured to set a crank angle of the crankshaft to a specific phase of the crankshaft. When the crankshaft is positioned in the specific phase, the intake valve or the exhaust valve of each of the cylinders each including the combustion chamber having an inner volume that has become larger than an average value of inner volumes of the combustion chambers of all of the plurality of the cylinders is in an open state. The injection portion is configured to inject, when the crankshaft is at the crank angle set by the setting portion, a fluid for a leak test through intake ports and exhaust ports in which the intake valves and the exhaust valves are respectively disposed and which are communicated with the combustion chambers, and through an opening of the engine other than the intake port and the exhaust ports, in a state where an opening of the engine other than the intake ports, the exhaust ports, and the opening of the engine to which the fluid is supplied at a time of the leak test is sealed. The measurement portion is configured to measure a pressure in the engine after injection of the fluid by the injection portion is completed.

With the leak test method and the leak test apparatus according to the above-described aspects, the leak test for leaks in the engine is performed at the crank angle set before the supply of the fluid, without rotating the crankshaft and the camshafts after the fluid is supplied. As a result, the time required for the leak test is reduced. In addition, the intake valve or the exhaust valve of each combustion chamber having a large inner volume, which requires a lot of time to be filled with the fluid, is in the open state. Thus, even the combustion chamber having a large inner volume is promptly filled with the fluid. On the other hand, even when the intake valve and the exhaust valve of each combustion chamber having a small inner volume, which does not require a lot of time to be filled with the fluid, is in the closed state, the measurement accuracy is less likely to be influenced. Moreover, each combustion chamber having a small inner volume is relatively promptly filled with the fluid flowing in the combustion chamber through gaps of piston rings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENT

Figure 1:
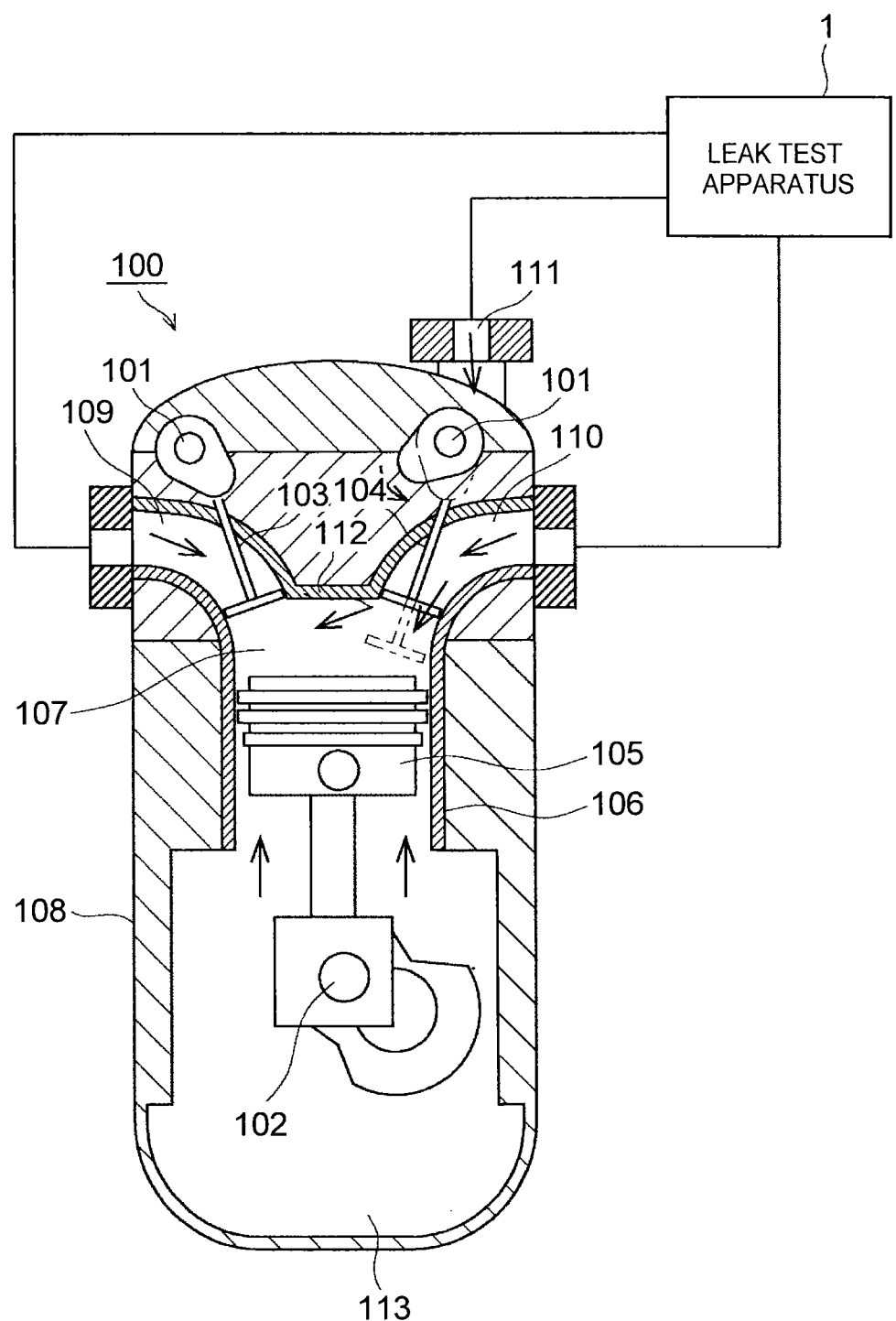
FIG. 1 is a sectional view illustrating the schematic configuration of an engine according to an embodiment of the invention.

Hereinafter, embodiments of the invention will be described with reference to the accompanying drawings. A leak test method and a leak test apparatus according to an embodiment of the invention are adopted to perform a test for leaks in an engine including camshafts, a crankshaft coupled to the camshafts via a timing belt, and a plurality of cylinders each including a combustion chamber. FIG. 1 is a sectional view illustrating the schematic configuration of the engine according to the present embodiment.

An engine 100 according to the present embodiment includes, for example, camshafts 101 rotatably disposed, a crankshaft 102 coupled to the camshafts 101 and rotatably disposed, and a plurality of cylinders 108. Each of the cylinders 108 is provided with at least one intake valve 103 driven by the camshaft 101 on the intake side and at least one exhaust valve 104 driven by the camshaft 101 on the exhaust side. Further, each of the cylinders 108 includes a combustion chamber 107 defined by a piston 105 driven by the crankshaft 102, a cylinder wall 106, and an engine head 112. At least one intake port 109 through which air is taken into the combustion chamber 107 and at least one exhaust port 110 through which exhaust gas is discharged from the combustion chamber 107 are communicated with the combustion chamber 107. The intake valves 103 are disposed in the respective intake ports 109, and the exhaust valves 104 are disposed in the respective exhaust ports 110.

Figure 2:
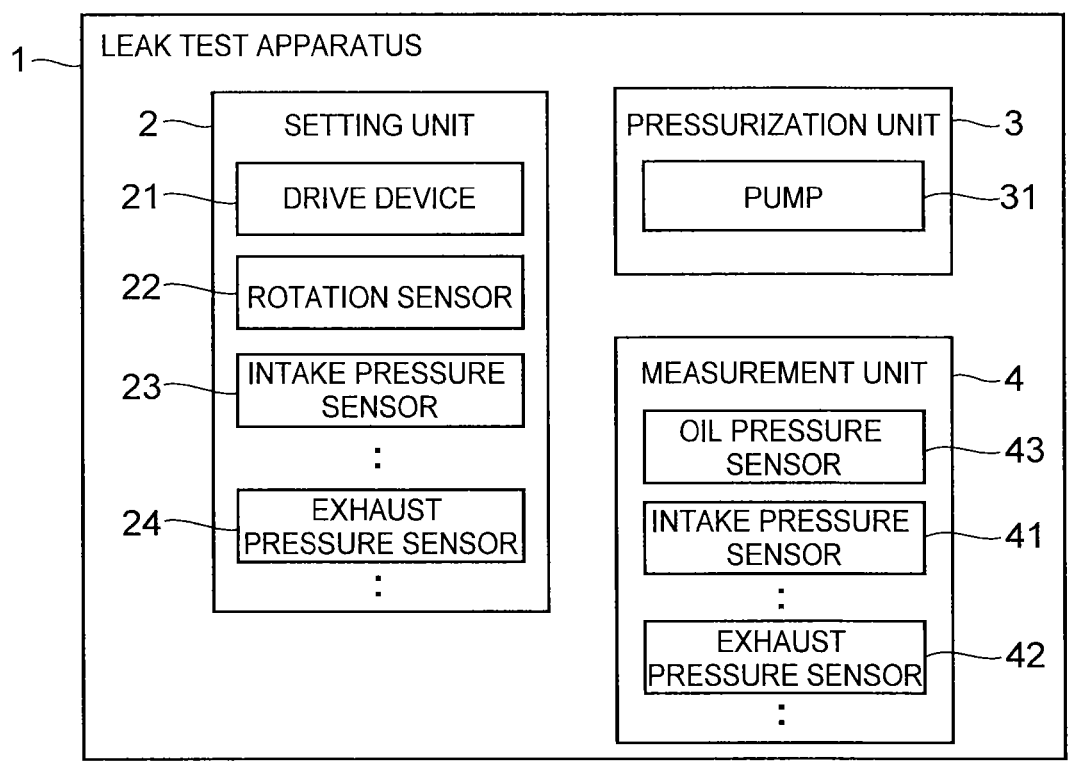
FIG. 2 is a block diagram illustrating the schematic system configuration of a leak test apparatus according to the embodiment of the invention.

FIG. 2 is a block diagram illustrating the schematic system configuration of the leak test apparatus according to the present embodiment. A leak test apparatus 1 according to the present embodiment includes a setting unit 2, a pressurization unit 3, and a measurement unit 4. The setting unit 2 sets a crank angle at which the crankshaft 102 is to be positioned when a leak test for leaks in the engine 100 is performed. The pressurization unit 3 injects a fluid for the leak test into the engine 100. The measurement unit 4 measures a pressure in the engine 100. The setting unit 2 may function as a setting portion, the pressurization unit 3 may function as an injection portion, and the measurement unit 4 may function as a measurement portion.

The setting unit 2 is an example of the setting portion. The setting unit 2 includes a drive device 21 (e.g. a motor) that rotates the crankshaft 102, a rotation sensor 22 (e.g. an encoder) that detects a rotation angle of a drive shaft of the drive device 21, a plurality of intake pressure sensors 23, and a plurality of exhaust pressure sensors 24. Each of the intake pressure sensors 23 detects a pressure in a corresponding one of the intake ports 109. Each of the exhaust pressure sensors 24 detects a pressure in a corresponding one of the exhaust ports 110. For example, a ring gear of the engine 100 is engaged with a pinion gear of the drive device 21. The drive device 21 rotates the crankshaft 102 to a prescribed crank angle (rotation angle) via the pinion gear and the ring gear, based on the rotation angle detected by the rotation sensor 22.

The hardware configuration of the setting unit 2 mainly includes a microcomputer. The microcomputer includes, for example, a central processing unit (CPU) that executes computational processing, memories such as read-only memory (ROM) that stores, for example, computational programs executed by the CPU, and random-access memory (RAM), and an interface portion (I/F) that receives signals from external devices and outputs signal to external devices. The CPU, the memories, and the interface portion are connected to one another via, for example, a data bus.

Although the drive device 21 is configured to be coupled to the crankshaft 102 via the pinion gear and the ring gear, the configuration is not limited to this. For example, a configuration may be employed in which a three-lug mechanism attached to the drive shaft of the drive device 21 holds a crank pulley coupled to the ring gear or the crankshaft.

When the intake valve 103 and the exhaust valve 104 (hereinafter, referred to as "intake and exhaust valves 103, 104") are opened, the pressures in the intake port 109 and the exhaust port 110 (hereinafter, referred to as "intake and exhaust ports 109, 110") change, respectively. Due to the pressure changes, the timings at which the intake and exhaust valves 103, 104 are opened are determined. Further, as described later, the relationship between the opening degrees of the intake and exhaust valves 103, 104 of each cylinder 108 and the inner volume of the combustion chamber 107 of the cylinder 108 is set in advance for each engine. Therefore, when the timing at which at least one of the intake and exhaust valves 103, 104 is opened is determined, it is possible to determine the crank angle of the crankshaft 102 of the engine 100 based on the relationship between the opening degree of the at least one of the intake and exhaust valves 103, 104 and the inner volume of the combustion chamber 107. In this manner, the setting unit 2 calculates the crank angle of the crankshaft 102 based on the pressure changes in the intake and exhaust ports 109, 110 detected respectively by the intake pressure sensors 23 and the exhaust pressure sensors 24. However, the method of calculating the crank angle of the crankshaft 102 is not limited to this.

The setting unit 2 may recognize, for example, a mark of the crank pulley (e.g. a mark indicating the position of the top dead center in a first cylinder 108) by using, for example, a camera to calculate the crank angle of the crankshaft 102. Alternatively, the setting unit 2 may calculate the crank angle of the crankshaft 102 by using a value detected by a rotation sensor provided on the crankshaft 102 or the camshaft 101. The setting unit 2 rotates the crankshaft 102 by using the drive device 21 such that the calculated crank angle of the crankshaft 102 coincides with the prescribed crank angle.

The pressurization unit 3 is an example of the injecting portion. The pressurization unit 3 includes a pump 31 that pumps out compressed air (an example of the fluid). The pump 31 is coupled to the intake ports 109, the exhaust ports 110, and an opening 111 of an oil filler (an example of an opening of the engine 100 other than the intake and exhaust ports 109, 110) via, for example, pipes. The pump 31 pumps the compressed air into the engine 100 through the intake ports 109, the exhaust ports 110, and the opening 111 of the oil filler. The pump 31 is coupled to the opening 111 of the oil filler. However, an opening to which the pump 31 is coupled is not limited to this. The pump 31 may be coupled to, for example, an opening of an oil level gauge or an opening of an oil filter. The pump 31 may be coupled to a prescribed opening on an oil circulation passage.

The measurement unit 4 is an example of the measurement portion. The measurement unit 4 includes a plurality of intake pressure sensors 41, a plurality of exhaust pressure sensors 42, and an oil pressure sensor 43. Each of the intake pressure sensors 41 detects a pressure in a corresponding one of the intake ports 109. Each of the exhaust pressure sensors 42 detects a pressure in a corresponding one of the exhaust ports 110. The oil pressure sensor 43 detects a pressure in the oil filler. The measurement unit 4 performs an inspection for leaks of air in the engine 100, based on the pressures in the intake ports 109 detected by the intake pressure sensors 41, the pressures in the exhaust ports 110 detected by the exhaust pressure sensors 42, and the pressure in the oil filler detected by the oil pressure sensor 43. The setting unit 2, the pressurization unit 3, and the measurement unit 4 may be configured to be integral with each other.

In a leak test, for example, the fluid is supplied into the engine 100 through the intake and exhaust ports 109, 110. In a conventional method, after the fluid starts to be supplied, it is necessary to open and close the intake valve 103 or the exhaust valve 104 of the combustion chamber 107 of each of the cylinders 108 by rotating the camshafts 101 in order to supply the fluid into the combustion chambers 107 of the cylinders 108. Thus, it takes a long time to perform this step. In particular, it takes a lot of time to fill the combustion chambers 107 having a large inner volume with the fluid. Thus, a higher priority needs to be given to a supply of the fluid to the combustion chambers 107 having a large inner volume.

In contrast to this, in the leak test method according to the present embodiment, the crank angle of the crankshaft 102 is set to a specific phase of the crankshaft 102. When the crankshaft 102 is positioned in the specific phase, the intake valve 103 or the exhaust valve 104 of each of the cylinders 108 each including the combustion chamber 107 having an inner volume that has become larger than an average value of the inner volumes of the combustion chambers 107 of all of the plurality of the cylinders 108 is in the open state. In the state where the crankshaft 102 is at the set crank angle (hereinafter, referred to as "target crank angle"), the fluid for the leak test is injected through the intake and exhaust ports 109, 110 in which the intake and exhaust valves 103, 104 are respectively provided, and through an opening of the engine 100 other than the intake and exhaust ports 109, 110. Then, after a lapse of a prescribed period of time from the start of the injection of the fluid (after the injection of the fluid is completed), the pressure in the engine 100 is measured.

In this way, the leak test for leaks in the engine 100 is performed at the set crank angle without rotating the crankshaft 102 and the camshafts 101 after the fluid is supplied. As a result, the time required for the leak test is reduced. In addition, the intake valve 103 or the exhaust valve 104 of each combustion chamber 107 having a large inner volume, which requires a lot of time to be filled with the fluid, (i.e., each combustion chamber 107 having an inner volume that has become larger than the average value of the inner volumes of the combustion chambers 107 of all of the plurality of the cylinders 108) is in the open state. Thus, the fluid is promptly supplied into the combustion chamber 107 through the intake valve 103 in the open state or the exhaust valve 104 in the open state. Thus, even the combustion chamber 107 having a large inner volume is promptly filled with the fluid. On the other hand, even when the intake valve 103 and the exhaust valve 104 of each combustion chamber 107 having a small inner volume, which does not require a lot of time to be filled with the fluid, (i.e., each combustion chamber 107 having an inner volume that has become smaller than the average value of the inner volumes of the combustion chambers 107 of all of the plurality of the cylinders 108) is in the closed state, the measurement accuracy is less likely to be influenced. This is because the inner volume of the combustion chamber 107 has become small. Moreover, each combustion chamber 107 having a small inner volume is relatively promptly filled with the fluid that is supplied through an opening of the engine 100 other than the intake and exhaust ports 109, 110 and then flows in the combustion chamber 107 through gaps of piston rings of the piston 105.

Figure 3:
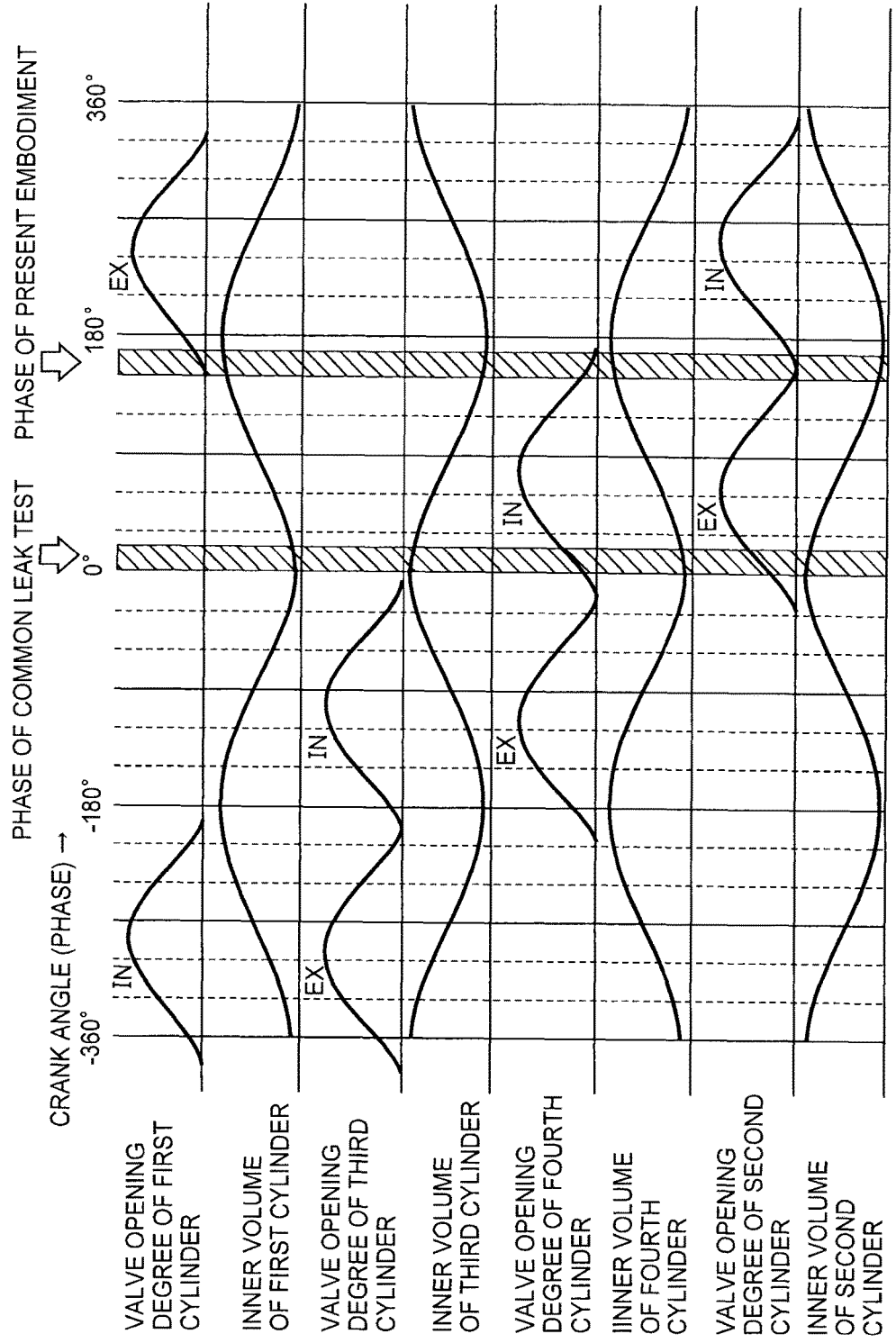
FIG. 3 is a graph illustrating an example of the relationship between the opening degrees of intake and exhaust valves of each of first to fourth cylinders, and the inner volumes of combustion chambers of the first to fourth cylinders.

Next, an example of a method of setting the target crank angle of the crankshaft 102 will be described in detail. FIG. 3 is a graph illustrating an example of the relationship between the opening degrees of the intake and exhaust valves of each of the first to fourth cylinders, and the inner volumes of the combustion chambers of the first to fourth cylinders. In FIG. 3, the abscissa axis indicates the crank angle of the crankshaft 102, and the ordinate axis indicates the opening degree of each of the intake and exhaust valves 103, 104 (0% to 100%) and the inner volume of each of the combustion chambers 107.

The relationship between the opening degrees of the intake and exhaust valves 103, 104 of each cylinder 108 and the inner volume of the combustion chamber 107 of the cylinder 108 is set in advance for each engine. In a common leak test, as illustrated in FIG. 3, the crank angle of the crankshaft 102 is set to an angle within a range from 0° to 20°. While the crankshaft 102 is positioned at a crank angle within the range from 0° to 20°, compressed air is injected through the intake and exhaust ports 109, 110 and the oil filler, and then the pressure in the engine 100 is measured.

In this case, for example, even though the inner volume of the combustion chamber 107 of the third cylinder 108 is at substantially the maximum (the piston 105 is in the vicinity of the bottom dead center), the intake and exhaust valves 103, 104 are fully closed. Thus, it takes more time for the combustion chamber 107 of the third cylinder 108 to be filled with the compressed air.

On the other hand, in the leak test method according to the present embodiment, as illustrated in FIG. 3, the target crank angle of the crankshaft 102 is set to, for example, an angle within a range from 150° to 170°.

In this case, the inner volume of the combustion chamber 107 of each of the first and fourth cylinders 108 is at substantially the maximum (the piston 105 is in the vicinity of the bottom dead center), and the exhaust valve 104 of the first cylinder 108 and the intake valve 103 of the fourth cylinder 108 are in the open state. Thus, the compressed air is promptly supplied into the combustion chambers 107 of the first and fourth cylinders 108 respectively through the exhaust valve 104 of the first cylinder 108 and the intake valve 103 of the fourth cylinder 108, which are in the open state. Thus, even the combustion chambers 107 having a large inner volume are promptly filled with the compressed air.

In this case, it is particularly preferable that the target crank angle is set to, for example, 160° that is a median value of the range from 150° to 170°, so that the exhaust valve 104 of the first cylinder 108 including the combustion chamber 107 having a large inner volume and the intake valve 103 of the fourth cylinder 108 including the combustion chamber 107 having a large inner volume are not fully closed. On the other hand, the inner volume of the combustion chamber 107 of each of the second and third cylinders 108 is at substantially the minimum (the piston 105 is in the vicinity of the top dead center), and the intake and exhaust valves 103, 104 of each of the second and third cylinders 108 are in the closed state. However, even when the intake and exhaust valves 103, 104 are in the closed state, the combustion chamber 107 of each of the second and third cylinders 108 are relatively promptly filled with the compressed air that flows in the combustion chamber 107 through the gaps of the piston rings. This is because the inner volume of the combustion chamber 107 of each of the second and third cylinders 108 is at substantially the minimum.

With the leak test method according to the present embodiment, the combustion chambers 107 of all the cylinders 108 are filled with the compressed air promptly, as described above. Thus, when the pressure in the engine 100 is measured after a lapse of the prescribed period of time, all the combustion chambers 107 are completely filled with the compressed air. As a result, the compressed air hardly flows in the engine 100. It is therefore possible to significantly reduce variations in the measured value of the pressure.

The target crank angle set for each engine as described above is stored in advance in, for example, the memory of the setting unit 2. At the time of a leak test, the setting unit 2 may automatically retrieve the target crank angle of the corresponding engine 100 from the memory and set the crankshaft 102 to the retrieved target crank angle.

Figure 4:
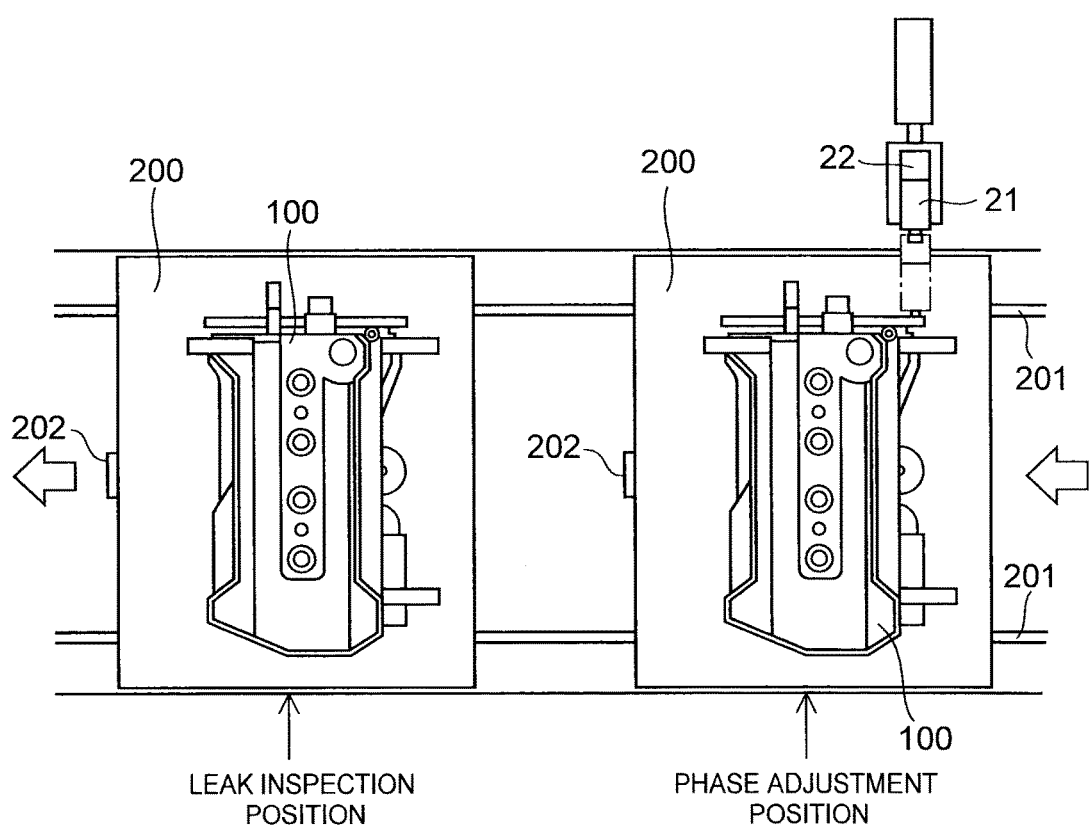
FIG. 4 is a view illustrating the engine at a phase adjustment position and the engine at a leak inspection position.

Next, the concrete procedure of the leak test method according to the present embodiment will be described. For example, as illustrated in FIG. 4, a conveyance pallet 200 on which the engine 100 is placed is conveyed by, for example, conveyors 201 and is stopped at a phase adjustment position by a stopper 202. At the phase adjustment position, the setting unit 2 causes the drive device 21 to approach the engine 100 by using a cylinder mechanism and causes the pinion gear of the drive device 21 and the ring gear of the engine 100 to be engaged with each other.

Figure 5:
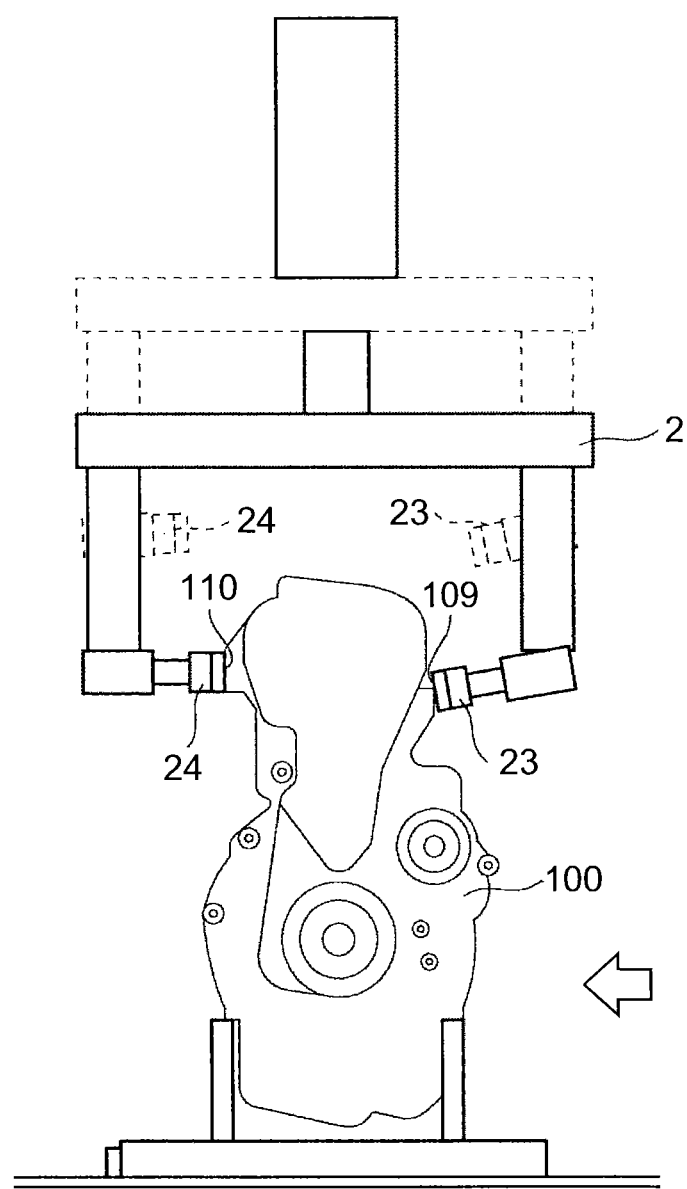
FIG. 5 is a view illustrating the state where the crank angle is set by a setting unit.

As illustrated in FIG. 5, the setting unit 2 causes the intake pressure sensors 23 to be coupled to the intake ports 109 and causes the exhaust pressure sensors 24 to be coupled to the exhaust ports 110 by using cylinders. The setting unit 2 causes the crankshaft 102 to rotate (to perform cranking) by rotating the drive device 21, thereby increasing, using the piston 105, the pressure in the combustion chamber 107 with the intake and exhaust valves 103, 104 fully closed. At this time, the intake pressure sensor 23 and the exhaust pressure sensor 24 detect the pressure in the intake port 109 and the pressure in the exhaust port 110, respectively.

The setting unit 2 calculates the crank angle of the crankshaft 102 based on changes in the pressures that are output from the intake pressure sensor 23 and the exhaust pressure sensor 24. The setting unit 2 causes the crankshaft 102 to rotate by using the drive device 21 such that the calculated crank angle of the crankshaft 102 coincides with the set target crank angle.

After the target crank angle of the crankshaft 102 is set, the stopper 202 is released. Then, the conveyance pallet 200 is conveyed by, for example, the conveyors 201 and stopped at a leak inspection position by a stopper 202 (FIG. 4). The measurement unit 4 may perform a leak inspection at the phase adjustment position without moving the conveyance pallet 200 to the leak inspection position.

Figure 6:
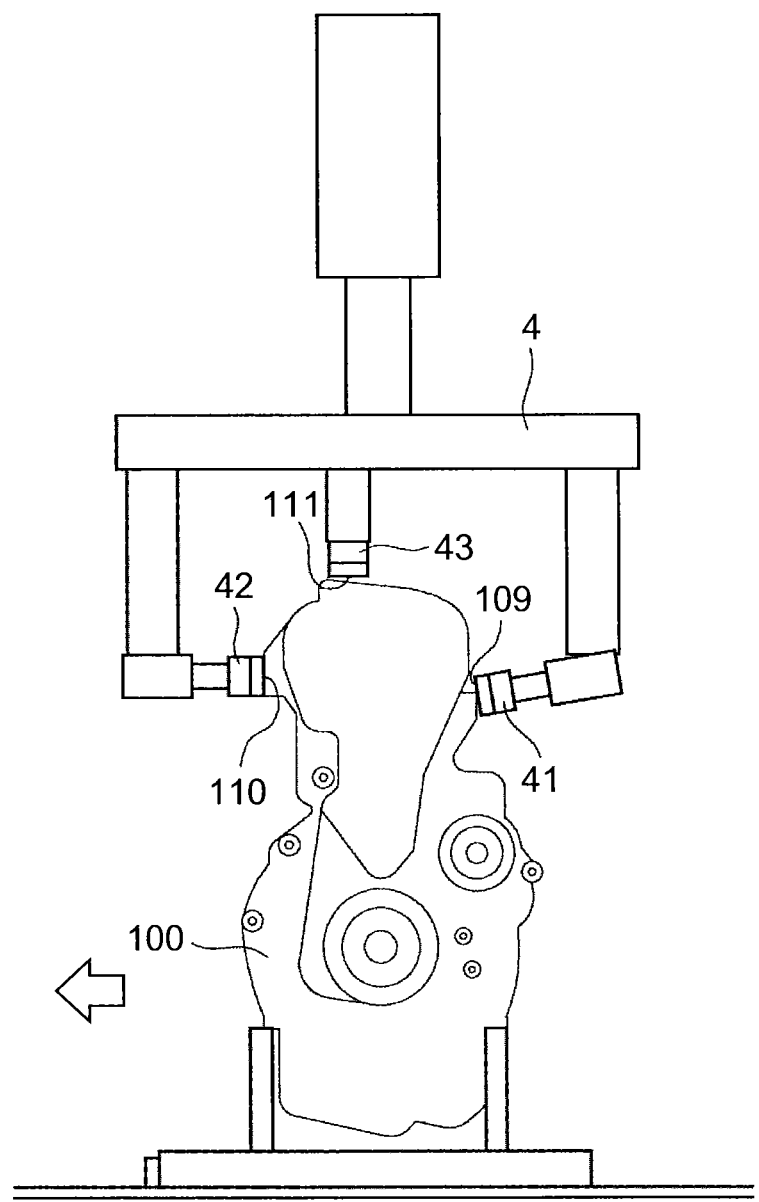
FIG. 6 is a view illustrating the state where measurement is performed by a measurement unit.

As illustrated in FIG. 6, the measurement unit 4 causes the intake pressure sensors 41 to be coupled to the intake ports 109, causes the exhaust pressure sensors 42 to be coupled to the exhaust ports 110, and causes the oil pressure sensor 43 to be coupled to the opening 111 of the oil filler by using cylinders. The measurement unit 4 may use the intake pressure sensors 23 and the exhaust pressure sensors 24 of the setting unit 2.

The pressurization unit 3 drives the pump 31 to inject the compressed air into the intake ports 109, the exhaust ports 110, and the opening 111 of the oil filler. The compressed air injected into the intake and exhaust ports 109, 110 passes through the intake and exhaust valves 103, 104 in the open state, and is then supplied into the combustion chambers 107. Simultaneously, the compressed air injected into the opening 111 of the oil filler is supplied to a crank chamber 113, and supplied from the crank chamber 113 into the combustion chambers 107 through the gaps of the piston rings.

At this time, for example, the intake valve 103 or the exhaust valve 104 of each combustion chamber 107 having a large inner volume (the piston 105 is in the vicinity of the bottom dead center) is in the open state. Thus, it is possible to promptly fill each combustion chamber 107 having a large inner volume with the compressed air from intake valve 103 in the open state or the exhaust valve 104 in the open state. On the other hand, the intake and exhaust valves 103, 104 of each combustion chamber 107 having a small inner volume (the piston 105 is in the vicinity of the top dead center) is in the closed state. However, even when the intake and exhaust valves 103, 104 are in the closed state, each combustion chamber 107 is relatively promptly filled with the compressed air flowing in the combustion chamber 107 through the gaps of the piston rings.

After a lapse of the prescribed period of time from the start of the injection of the compressed air performed by the pressurization unit 3, the intake pressure sensors 41, the exhaust pressure sensors 42, and the oil pressure sensor 43 of the measurement unit 4 detect the pressures in the intake ports 109, the exhaust ports 110, and the opening 111 of the oil filler, respectively. At this time, all the combustion chambers 107 are completely filled with the compressed air. As a result, the compressed air hardly flows in the engine 100. It is therefore possible to significantly reduce variations in the measured value of the pressure. Thus, the intake pressure sensors 41, the exhaust pressure sensors 42, and the oil pressure sensor 43 of the measurement unit 4 can detect the pressures in the intake ports 109, the exhaust ports 110, and the opening 111 of the oil filler with high accuracy.

For example, when an amount of change in the pressure detected by the intake pressure sensors 41, the exhaust pressure sensors 42, and the oil pressure sensor 43 becomes equal to or larger than a prescribed value, the measurement unit 4 determines that a leak has occurred in the engine 100, thereby detecting the leak with high accuracy.

In the leak test method according to the present embodiment described above, the crank angle of the crankshaft 102 is set to a specific phase of the crankshaft 102. When the crankshaft 102 is positioned in the specific phase, the intake valve 103 or the exhaust valve 104 of each of the cylinders 108 each including the combustion chamber 107 having an inner volume that has become larger than an average value of the inner volumes of the combustion chambers 107 of all of the plurality of the cylinders 108 is in the open state. After the crankshaft 102 is set to the crank angle, the fluid for the leak test is injected through the intake and exhaust ports 109, 110 in which the intake and exhaust valves 103, 104 are respectively provided, and through an opening of the engine 100 other than the intake and exhaust ports 109, 110. Then, after a lapse of the prescribed period of time from the start of the injection of the fluid, the pressure in the engine 100 is measured.

Thus, the leak test for leaks in the engine 100 is performed at the crank angle set before the fluid is supplied, without rotating the crankshaft 102 and the camshafts 101 after the fluid is supplied. As a result, the time required for the leak test is reduced. In addition, the intake valve 103 or the exhaust valve 104 of each combustion chamber 107 having a large inner volume, which requires a lot of time to be filled with the fluid, is in the open state. Thus, the fluid is promptly supplied into the combustion chamber 107 through the intake valve 103 in the open state or the exhaust valve 104 in the open state. Thus, even the combustion chamber 107 having a large inner volume is promptly filled with the fluid. On the other hand, even when the intake valve 103 and the exhaust valve 104 of each combustion chamber 107 having a small inner volume, which does not require a lot of time to be filled with the fluid, is in the closed state, the measurement accuracy is less likely to be influenced. Moreover, each combustion chamber 107 having a small inner volume is relatively promptly filled with the fluid that flows in the combustion chamber 107 through gaps of piston rings of the piston 105.

The invention is not limited to the above-described embodiment, and various changes may be made to the above-described embodiment within the scope of the invention. In the above-described embodiment, the leak test method is applied to the engine 100 including four cylinders. However, the engines to which the invention is applied are not limited to a four-cylinder engine. For example, the leak test method according to the present embodiment may be applied to an engine including six cylinders or eight cylinders. The leak test method according to the present embodiment may be applied to an engine including a predetermined number of cylinders. In the above-described embodiment, the leak test is performed by injecting the compressed air into the engine 100. However, the fluid to be injected into the engine 100 is not limited to the compressed air. For example, the leak test may be performed by injecting a prescribed liquid into an engine.

What is claimed is:

1. A leak test method of detecting a leak in an engine including camshafts rotatably disposed, a crankshaft coupled to the camshafts and rotatably disposed, and a plurality of cylinders, each of the cylinders being provided with an intake valve and an exhaust valve that are driven by the camshafts, and each of the cylinders including a combustion chamber defined by a cylinder wall, an engine head, and a piston driven by the crankshaft, the leak test method comprising:
    setting a crank angle of the crankshaft to a specific phase of the crankshaft, the specific phase being a phase in which the intake valve or the exhaust valve of each of the cylinders each including the combustion chamber having an inner volume that has become larger than an average value of inner volumes of the combustion chambers of all of the plurality of cylinders is in an open state when the crankshaft is positioned in the specific phase;
    injecting, when the crankshaft is at the set crank angle, a fluid for a leak test through intake ports and exhaust ports in which the intake valves and the exhaust valves are respectively disposed, the intake ports and the exhaust ports being communicated with the combustion chambers, and through an opening of the engine other than the intake ports and the exhaust ports, in a state where an opening of the engine other than the intake ports, the exhaust ports, and the opening of the engine to which the fluid is supplied at a time of the leak test is sealed; and
    measuring a pressure in the engine after injection of the fluid is completed,
    wherein the injecting the fluid and the measuring the pressure are performed with the set crank angle without rotating the crank shaft and cam shaft after the crank angle is set.

2. The leak test method according to claim 1, wherein, in setting the crank angle, the crank angle is set to a target crank angle that is set in advance for the engine.

3. The leak test method according to claim 1, wherein, in measuring the pressure, it is determined that a leak has occurred in the engine when an amount of change in a detected pressure is equal to or larger than a prescribed value.

4. A leak test apparatus configured to detect a leak in an engine including camshafts rotatably disposed, a crankshaft coupled to the camshafts and rotatably disposed, and a plurality of cylinders, each of the cylinders being provided with an intake valve and an exhaust valve that are driven by the camshafts, and each of the cylinders including a combustion chamber defined by a cylinder wall, an engine head, and a piston driven by the crankshaft,
    the leak test apparatus comprising:
    a setting portion configured to set a crank angle of the crankshaft to a specific phase of the crankshaft, the specific phase being a phase in which the intake valve or the exhaust valve of each of the cylinders each including the combustion chamber having an inner volume that has become larger than an average value of inner volumes of the combustion chambers of all of the plurality of the cylinders is in an open state when the crankshaft is positioned in the specific phase;
    an injection portion configured to inject, when the crankshaft is at the crank angle set by the setting portion, a fluid for a leak test through intake ports and exhaust ports in which the intake valves and the exhaust valves are respectively disposed, the intake ports and the exhaust ports being communicated with the combustion chambers, and through an opening of the engine other than the intake port and the exhaust ports, in a state where an opening of the engine other than the intake ports, the exhaust ports, and the opening of the engine to which the fluid is supplied at a time of the leak test is sealed; and
    a measurement portion configured to measure a pressure in the engine after injection of the fluid by the injection portion is completed,
    wherein the injecting the fluid and the measuring the pressure are performed with the set crank angle without rotating the crank shaft and cam shaft after the crank angle is set.

5. The leak test apparatus according to claim 4, wherein the setting portion includes:
    a drive device configured to rotate the crankshaft;
    a rotation sensor configured to detect a rotation angle of a drive shaft of the drive device;
    intake pressure sensors each configured to detect a pressure in a corresponding one of the intake ports of the engine; and exhaust pressure sensors each configured to detect a pressure in a corresponding one of the exhaust ports of the engine.

6. The leak test apparatus according to claim 4, wherein the injection portion includes a pump configured to pump out compressed air.

7. The leak test apparatus according to claim 4, wherein the measurement portion includes:
   intake pressure sensors each configured to detect a pressure in a corresponding one of the intake ports;
   exhaust pressure sensors each configured to detect a pressure in a corresponding one of the exhaust ports; and
   an oil pressure sensor configured to detect a pressure in the opening of the engine other than the intake ports and the exhaust ports.

* * * * *